US008951492B2

(12) United States Patent
Sun et al.

(10) Patent No.: US 8,951,492 B2
(45) Date of Patent: *Feb. 10, 2015

(54) AMMONIA GAS GENERATION FROM UREA FOR LOW TEMPERATURE PROCESS REQUIREMENTS

(75) Inventors: William H. Sun, Lisle, IL (US); John M. Boyle, Oak Park, IL (US); Paul G. Carmignani, Naperville, IL (US); Scott M. Mayhew, North Aurora, IL (US)

(73) Assignee: Fuel Tech, Inc., Warrenville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,459

(22) Filed: Apr. 25, 2012

(65) Prior Publication Data

US 2013/0287669 A1    Oct. 31, 2013

(51) Int. Cl.
*C01C 1/08* (2006.01)
(52) U.S. Cl.
CPC ......... *C01C 1/086* (2013.01); *C01B 2210/0075* (2013.01)
USPC ............................ 423/358; 423/354; 423/356
(58) Field of Classification Search
CPC ........................ C01C 1/086; C01B 2210/0075
USPC .................................................. 423/352–358
See application file for complete search history.

(56) References Cited

U.S. PATENT DOCUMENTS

| | | | |
|---|---|---|---|
| 6,314,722 B1 * | 11/2001 | Matros et al. | 60/274 |
| 2007/0231232 A1 * | 10/2007 | Lin et al. | 423/235 |
| 2009/0324453 A1 * | 12/2009 | Harinath et al. | 422/171 |

* cited by examiner

*Primary Examiner* — Stanley Silverman
*Assistant Examiner* — Justin Bova
(74) *Attorney, Agent, or Firm* — Thaddius J. Carvis

(57) ABSTRACT

Disclosed are methods and apparatus for providing an ammonia feed for a low-temperature process. The process includes two defined stages, gasification and hydrolysis. In a first stage thermal reactor, an aqueous urea solution is fed to a gasification chamber and heated gases are controlled in response to demand from a low temperature process requiring ammonia. The heated gases and aqueous urea are introduced into the gasification chamber upstream to fully gasify the solution of aqueous urea to a first stage gas stream comprising ammonia and isocyanic acid. The first stage gas stream is withdrawn and maintained hot enough to prevent solids formation. All amounts of urea feed, water and heated gases fed into the first stage thermal reactor are monitored and adjusted as necessary to achieve efficient hydrolysis in the second stage hydrolysis reactor. The second stage gas stream is withdrawn from the second stage reactor responsive to demand from a low temperature process requiring ammonia.

2 Claims, 2 Drawing Sheets

AMMONIA GAS GENERATION FROM UREA FOR LOW TEMPERATURE PROCESS REQUIREMENTS

FIELD OF THE INVENTION

The invention relates generally to ammonia generation from urea for processes requiring at least intermittent operation at low temperatures, e.g., low-temperature selective catalytic reduction (SCR) of $NO_x$, ammonia flue gas conditioning for enhanced electrostatic precipitator (ESP) operation, and the like.

BACKGROUND OF THE INVENTION

There are a number of processes for which urea gasified by a thermal process is useful if the temperature of the gases is sufficient to permit its use without causing condensation of solids in the system. For low-temperature processing, however, the decomposition products in these gases can cause problems. See, for example: Modern Power Systems, "Ammonia SCR performance from a urea-based system", May 2004, pages 27, 29, 30 and 31, which notes that tests showed that urea decomposition products were found to reform urea when cooled, or that they could deposit on cool surfaces as urea. They found that appropriate heating or insulation was required to obviate low-temperature surfaces. Thus, low-temperature use of the thermally-gasified urea can cause problems.

When aqueous urea is heated, a number of chemical reactions, controlled by temperature-dependent rate constants, determine how urea is broken down:

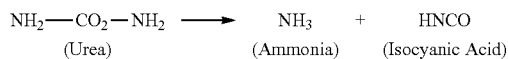

This reaction can occur at a temperature of 275° F.; but the HNCO, unless hydrolyzed or maintained very hot can form solid byproducts that can deposit on equipment and foul catalysts. The HNCO will be converted as follows:

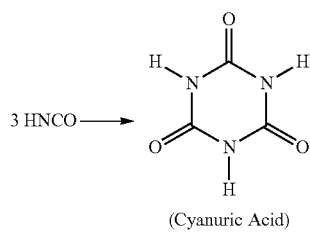

Cyanuric acid, if formed (and it is likely to form) decomposes at about 700° F. The full conversion of urea to ammonia can involve the following reactions, but not all are desirable and efforts should be made to moderate or eliminate their negative effects:

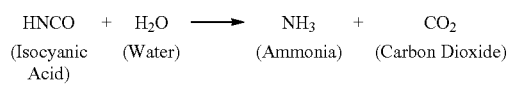

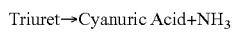

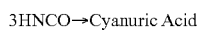

These reactions are rate dependent as well as dependent on the physical form of the reactants, the prevailing temperature, the time in the reactor and the presence or absence of water and/or a catalyst.

There are a number of references that discuss converting urea to ammonia; however, a review of the art has not enabled the efficient conversion of urea to ammonia in a form that could be used for low-temperature operations. Prominent among the prior art processes are: (a) wet processes, such as U.S. Pat. No. 6,077,491 to Cooper, et al., and U.S. Pat. No. 5,543,123 to Hofmann, et al.; (b) high-temperature processes such as U.S. Pat. No. 7,090,810 to Sun, et al., or U.S. Pat. No. 7,682,586 to Harold, et al., and (c) catalytic processes such as, for example, U.S. Pat. No. 6,878,359, to Mathes, et al., and EP 487 886 to MAN.

Also of note for their lack of teachings enabling efficient production of ammonia from urea for low temperature operations is U.S. Pat. No. 5,431,893, to Hug, et al. To protect the SCR catalyst from fouling, Hug, et al., proposes bulky equipment capable of treating all effluent with urea. Regardless of physical form, urea takes time to break down in hot exhaust gases and may cause nozzle plugging at the temperatures most conducive to gasification. This disclosure highlights the problems making it a necessity that the urea solution is maintained at a temperature below 100° C. to prevent hydrolysis in the injection equipment. They propose the use of moderate urea pressures when feeding the urea and find it necessary to have alternative means to introduce high-pressure air into the feed line when it becomes plugged. The nozzles employed by Hug, et al., use auxiliary air to aid dispersion. Also, they employ dilute solutions that require significant heating to simply evaporate the water. See also, WO 97/01387 to Müller, et al.

In European Patent Specification 615,777 A1, there is described an apparatus that feeds solid urea into a channel containing exhaust gases, which are said to hydrolyze the urea in the presence of a catalyst. For successful operation the disclosure indicates that it is necessary to employ compressed air for dispersion of fine solids, means for grinding the urea into fine solids and a coating to prevent urea prills from sticking together. The disclosure notes that if the inside of the catalyzer and the nozzle tip only were coated with the catalyst, corrosion and deposition would occur. The introduction of solid urea into the gas stream—possibly depositing urea on the SCR catalyst—also eliminates control of water to the reactor in amounts necessary for efficient hydrolysis, without which HNCO will remain and potentially harmful byproducts will be present.

U.S. Pat. No. 6,878,359, to Mathes, et al., describes a single stage process using a catalyst to gasify urea, but provides no indication that separating gasification from hydrolysis into two stages as found highly effective for low-temperature applications by the invention herein, would be a useful alternative to a single stage process. We note that Mathes, et al., does not teach high enough initial temperature, temperature maintenance, or proper droplet size for a two stage process. Importantly, unless the droplets are small enough in the first-stage gasification, the droplets will not release the urea for decomposition early enough in a short, e.g., 1 to 10 second, time frame to fully gasify the urea, and the likelihood of forming byproducts downstream in the ductwork or the catalyst is increased.

Similar to the above U.S. Pat. No. 6,077,491 to Cooper, et al., is U.S. Pat. No. 6,146,605 to Spokoyny, where there is described a combined SCR/SNCR process in a staged process involving a separate step of hydrolyzing the urea prior to an SCR stage. A similar process is disclosed in U.S. Pat. Nos. 5,985,224 and 6,093,380 to Lagana, et al., which describe a method and apparatus involving the hydrolysis of urea followed by a separation of a gas phase from a liquid hydrolysate phase. In all these processes there is a requirement to handle a significant amount of high temperature and high pressure gas and liquid phases containing ammonia during and after hydrolysis. This extra processing requires the purchase and maintenance of additional equipment, an emergency plan and equipment to handle ammonia release in case of process failures, and it would be desirable to have a system which operated more safely, simply and efficiently.

It becomes apparent to the skilled worker that the art is not enabling for low-temperature effective ammonia from urea generation in an efficient manner. In the case of air pollution control, examples of low-temperature processing where it would be desirable to use ammonia from a urea source include flue gas conditioning. Here, a small amount of ammonia is injected, which differs from selective catalytic reduction systems (SCR) which operate at somewhat higher temperatures and depend on ammonia in relatively large amounts.

While it is noted that EP 0 373 351 to ENEL employs urea to create ammonia to enhance the efficiency of the electrostatic precipitator, the urea is supplied as a mixture of urea, hydrate lime and water for reducing pollutant materials in the flue gases and does not produce the ammonia suitable for low-temperature operations apart from the combustor. Urea reduces the $NO_x$ and hydrate lime reduces the sulfur compounds.

There is a present need for a process, apparatus and system for efficient supply of ammonia from urea that does not have low-temperature penalties.

SUMMARY OF THE INVENTION

The present invention provides processes, apparatus and systems for efficient supply of ammonia from urea that does not have low-temperature penalties.

More particularly, the present invention provides processes, apparatus and systems for efficient supply of ammonia from urea to low-temperature processes, such as flue gas conditioning, that has all of the advantages of urea gasification without any penalties caused by byproduct formation.

When using urea to produce ammonia for low-temperature operations, it Is important to utilize two stages for the conversion, the first stage being a thermal gasification of urea to produce ammonia and isocyanic acid, followed directly with a second stage being a controlled catalyzed hydrolysis reaction wherein the isocyanic acid (HNCO) is hydrolyzed to ammonia with carbon dioxide as a byproduct. The process steps will both require careful temperature control, and the second stage will require controlling the water to achieve at least a critical amount of water without employing so much that the equipment must be too large to operate efficiently and create thermal demands in excess of those necessary for effective reaction.

It is important to run the reaction in a manner to maintain a low concentration of intermediate byproducts, e.g., cyanuric acid, in particular, so as to minimize the chances for side reactions to produce adverse byproducts, e.g., in cold spots in the reactors or ducting. Thus, the relative molar amounts of urea, water and air are important for successful operation.

In one aspect, a process is provided comprising: (a) in a first stage thermal reactor, feeding an aqueous urea solution to a gasification chamber, (b) controlling feed of urea, water and heated gases to the first stage reactor in response to demand from a low temperature process requiring ammonia; (c) feeding heated gases into the gasification chamber upstream of the point for introducing the urea; wherein the inlet temperature of the gases in the gasification chamber is within the range of from 700 to 1400° F. and is sufficient for time in the gasification reactor to fully gasify the aqueous urea solution to provide a first stage gas stream comprising ammonia and isocyanic acid; (d) withdrawing the first stage gas stream from the first stage thermal reactor and maintaining the temperature of first stage gas stream above 550° F. to a point of introduction into a second stage catalytic reactor; (e) introducing the first stage gas stream into a second stage catalytic hydrolysis reactor; (f) monitoring the amounts of urea feed, water and heated gases fed into the first stage thermal reactor and adjusting as necessary to achieve efficient hydrolysis in the second stage hydrolysis reactor; (g) maintaining the temperature of the second stage hydrolysis reactor at a temperature above 370° F.; and (h) withdrawing a second stage gas stream from the second stage reactor responsive to demand from a low temperature process requiring ammonia.

In a preferred aspect, the urea is employed as an aqueous solution having a concentration of within the range of from 30 to 70% by weight to provide an overall molar ratio of water to urea in the system including moisture in the heated air fed to the first stage reactor within the range of from 2:1 to 20:1, preferably within the range of from 3:1 to 10:1.

In another aspect, an apparatus is provided comprising: (a) a first stage thermal reactor, including a gasification chamber and means for feeding an aqueous urea solution to the gasification chamber; (b) means for controlling feed of urea, water and heated gases to the first stage reactor in response to demand from a low temperature process requiring ammonia; (c) means for feeding heated gases into the gasification chamber upstream of the point for introducing the urea; wherein the inlet temperature of the gases in the gasification chamber is within the range of from 700 to 1400° F. and is sufficient for time in the gasification reactor to fully gasify the aqueous urea solution to provide a first stage gas stream comprising ammonia and isocyanic acid; (d) means for withdrawing the first stage gas stream from the first stage thermal reactor and maintaining the temperature of first stage gas stream above 500° F. to a point of introduction into a second stage catalytic reactor; (e) means for introducing the first stage gas stream into a second stage catalytic hydrolysis reactor; (f) means for monitoring the amounts of urea feed, water and heated gases fed into the first stage thermal reactor and adjusting as necessary to achieve efficient hydrolysis in the second stage hydrolysis reactor; (g) means for maintaining the temperature of the second stage hydrolysis reactor at a temperature above 370° F.; and (h) means for withdrawing a second stage gas stream from the second stage reactor responsive to demand from a low temperature process requiring ammonia.

Preferably, the method and apparatus are employed in combination with an electrostatic precipitator to improve operation of the electrostatic precipitator at temperatures below 380° F.

Systems employing the process and apparatus as disclosed are also provided.

Other and preferred aspects of the invention are described below.

DESCRIPTION OF THE DRAWINGS

The accompanying drawings, which are incorporated in and constitute a part of this description, illustrate presently preferred embodiments of the invention, and together with the the detailed description of the preferred embodiments given below, serve to explain the principles of the invention. As shown throughout the drawings, like reference numerals designate like or corresponding parts.

DETAILED DESCRIPTION OF THE INVENTION

Figure 1:
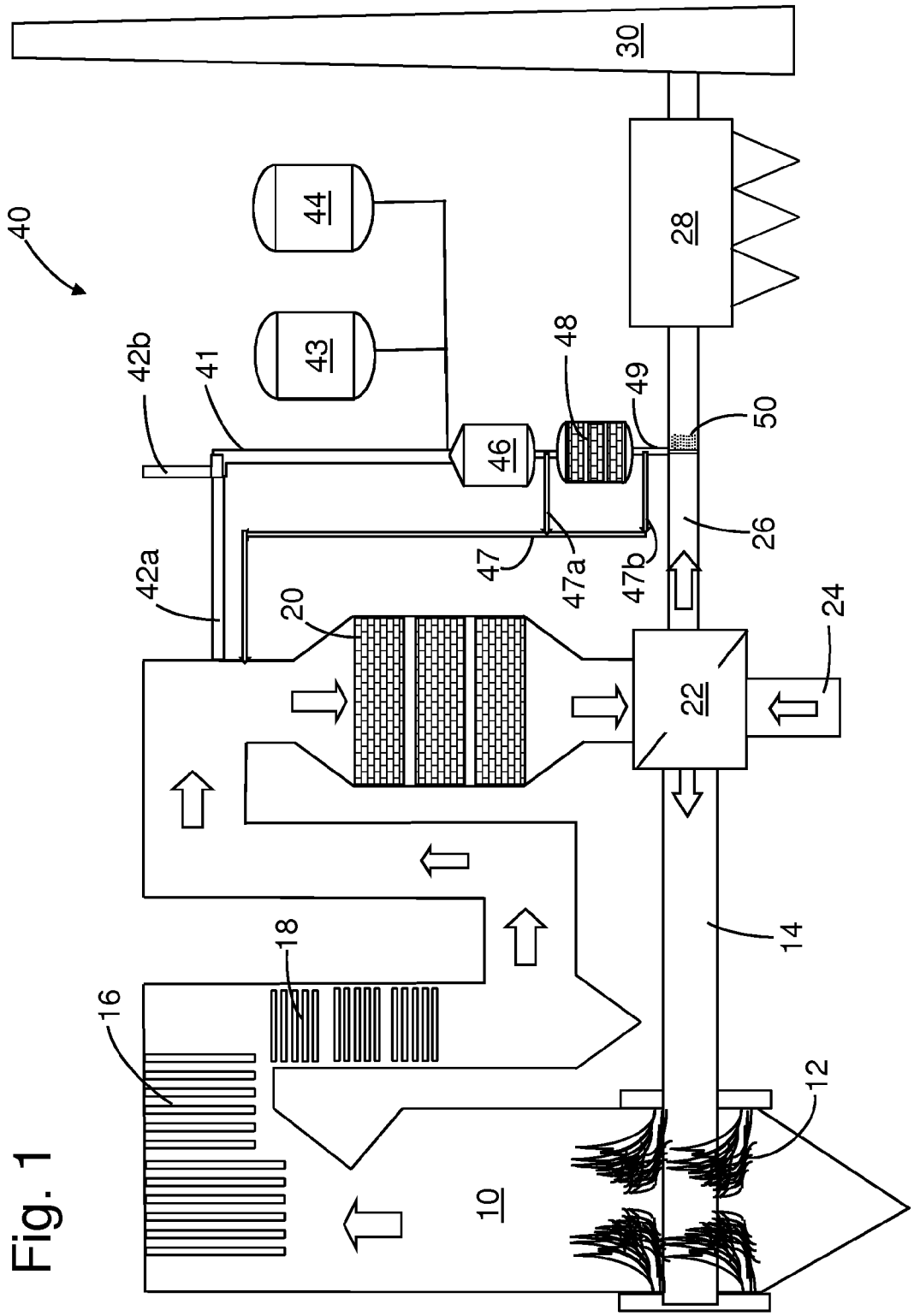
FIG. 1 is a schematic diagram of a combustion installation that takes advantage of the present invention employing a preferred embodiment of the process and system of the invention.
Figure 2:
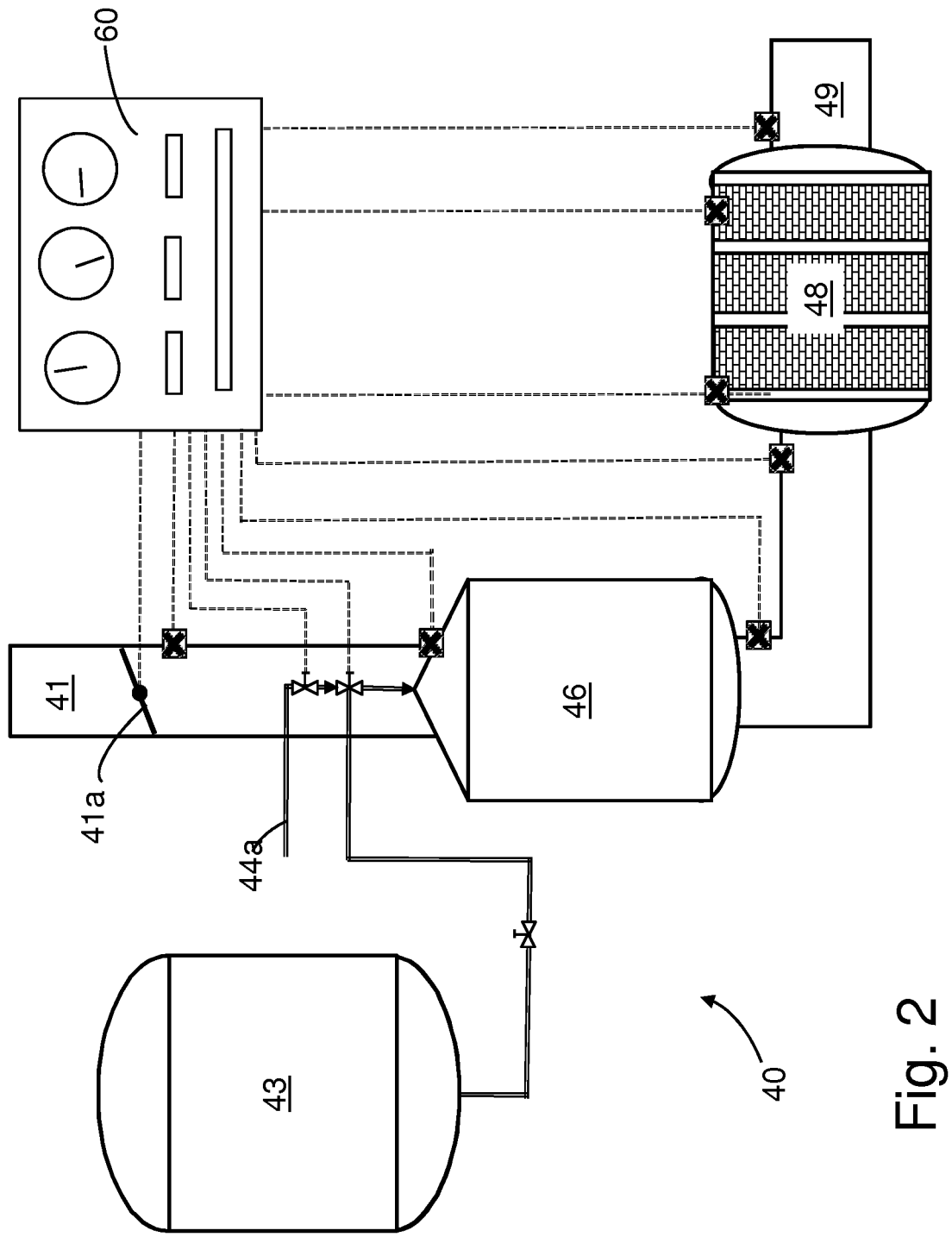
FIG. 2 is a schematic diagram showing greater detail of aspects of a system of the type shown in FIG. 1.

In describing the present invention, reference is made to the drawings, wherein there is seen a simplified, preferred embodiment shown schematically in FIG. 1 and FIG. 2. The drawings and the process they represent will be described briefly below.

The term "urea" is meant to encompass urea in all of its commercial forms that will typically consist essentially of urea, containing 95% or more urea by weight. This relatively pure form of urea is preferred and has several advantages in the process of the invention. The urea is preferably supplied to the process as an aqueous solution at a concentration of from about 30 to about 70%, with about 45 to about 60% being most preferred.

When urea is gasified by a thermal treatment alone, the reactant gas will contain ammonia and it will also contain isocyanic acid (HNCO) which would otherwise require very high temperatures to avoid the formation of byproducts in side reactions. A gasified product at this stage would not be suitable as such for low-temperature processes. The invention addresses this concern and provides a low-cost, low-energy solution.

The gas stream from such thermal processes includes a carrier medium, such as air or post-combustion gases, any water in the air, gases or urea solution, and urea decomposition products of HNCO and $NH_3$. If this thermal decomposition gas stream approaches 290° F., the HNCO and $NH_3$ can combine to form a condensable solid (urea) that will be present as an aerosol or a deposit on cooler surfaces. The invention controls the relative amounts of the components in the thermal decomposition gas stream materials and their temperature of handling and passes this gas stream through a second stage catalytic hydrolysis reactor at a temperature hotter than the recombination temperature, whereby the HNCO is efficiently converted to $NH_3$ and problems of urea or byproduct condensation are eliminated. This second stage conversion reduces the risk of recombination at low temperature, allowing for operation of the gasification system in applications requiring low temperatures, such as low temperature SCRs, ESPs, or for feed into a low-temperature fan.

The addition of a second stage catalyst reactor to a urea gasification system allows reagent that has been decomposed in the first stage to be delivered at lower temperatures than previously possible (less than approximately 380° F.) without the risk of recombination and condensation as smoke or deposit on a cool surface. This extends the useful process temperature range and permits the use of an ammonia-containing gas feed system for low-temperature applications, even cold-side ESP (200° F. to 500° F.) and low-temperature SCR applications for $NO_x$ control (300° F. to 600° F.). In addition, this configuration makes it possible to utilize low-temperature blowers or fans (below 600° F.) in the post-gasification gases rather than being limited to higher temperature fans or blowers (above 600° F.) at the inlet to the thermal gasification stage. Another advantage of the invention is that there is no requirement for high temperatures in ducts used to transport thermally gasified product streams. Thus, while the first stage gasification chamber must operate at temperatures sufficient for urea decomposition there is no need to maintain such high temperatures in ducts following the second stage hydrolysis.

It is also an advantage of the invention that the two-stage reactor system can be employed to supply ammonia to a relatively low volume use at low temperatures and low concentrations, e.g., to an ESP at concentrations of only 1 to 30 ppm, e.g., 3 to 10 ppm, as the sole use of ammonia. And, the system can also be configured to supply a second stream at higher ammonia concentration, such as for SCR, at higher concentrations, e.g., 100 to 1000 ppm. The higher volume use can be drawn from either the first-stage or the second-stage reactor, as will be described in connection with FIG. 1.

The invention, thus, solves the problem that thermally-gasified urea is available for low-volume and relatively low-temperature use without problems of condensation or forming deposits on equipment and without the need to maintain the temperature simply to avoid deposits. FIG. 1 is a schematic diagram of a combustion installation that takes advantage of the present invention to provide a relatively low-temperature ammonia gas stream obtained by gasifying aqueous urea in a first stage and then catalytically hydrolyzing substantially all isocyanic acid in the stream in a defined second stage. The combustion installation includes a combustor 10 having burners that provide thermal heat in combustion zone 12 by burning fuel from a source not shown with air supplied by duct work 14. Hot combustion gases will pass through the furnace 10 in the direction indicated by the block arrows and the heat from combustion is transferred to heat exchangers 16 and 18 prior to passing into a selective catalytic reduction (SCR) reactor 20 wherein $NO_x$ created during combustion can be treated with ammonia or gasified urea to convert the $NO_x$ to nitrogen and water. Alternatively, many installations will benefit from selective non catalytic reduction (SNCR) using urea alone at higher temperatures, e.g., as taught by Epperly, et al., in U.S. Pat. No. 5,057,293, without requiring the reactor 20.

Following SCR reactor 20, the combustion gases will flow through an air-to-air heat exchanger 22, which is used to preheat outside air supplied via duct 24 for delivery to the combustion zone 12 via line 14. The gases leaving the heat exchanger 22 are cooled significantly by the time they are passed through duct work 26 to electrostatic precipitator (ESP) 28 wherein particulates are collected prior to passing the gases up stack 30. This is a highly-simplified version of actual industrial or utility combustors and effluent treatment processes, but illustrates a workable scheme.

The operation of an ESP, such as 28, is often enhanced by flue gas conditioning. Flue gas conditioning will typically call for the controlled introduction into the exhaust gases of small amounts of a conditioning agent, such as ammonia and/or sulfur trioxide. The effect is to reduce the resistivity of the fly ash and to facilitate its collection in an ESP. It is preferred to employ ammonia to improve collection even when sulfur trioxide levels are sufficient to reduce resistivity. The invention enables the introduction of ammonia into the relatively cool gases in duct 26 prior to the ESP unit 28, without either risking the storage of ammonia gas or fouling duct work with byproducts of urea gasification. FIG. 1 shows an arrangement of apparatus (shown generally as 40) capable of providing a supply of ammonia.

The ammonia supply system 40 is shown to include process air supply 41, a urea supply 43, water supply 44, first stage thermal gasification chamber 46 and second stage catalytic hydrolysis reactor 48. The resulting ammonia is supplied to duct 26 via line 49 and ammonia injection grid 50, or the like. The air for the ammonia supply system 40 can be either a side stream of flue gas from line 42a or alternate air from ambient via line 42b or from preheater 22, or elsewhere, from a line not shown. The amount of process air, its temperature and moisture content are important to the efficiency of the process and will be monitored for process control.

As noted above, is an advantage of the invention that the two-stage reactor system can be employed to supply ammonia to a relatively low volume use at low temperatures and low concentrations, e.g., to an ESP at concentrations of only 1 to 30 ppm, e.g., 3 to 10 ppm, as the sole use of ammonia. In this case, the ammonia would be supplied via line 49, as shown. And, the system can also be configured to supply a second stream at higher ammonia concentration, such as for SCR, at higher concentrations, e.g., 100 to 1000 ppm, via lines 47a or 47b. Each of these arrangements has a number of advantages, such as for the arrangement wherein line 47a is employed to feed the high-volume use from the first-stage reactor 46.

FIG. 2 shows the ammonia supply system 40 in greater detail, yet still schematically. The numbering for FIG. 2 employs the numbers from FIG. 1, where applicable and continues with additional features, such as controller 60 and associated sensors (■) and valves (✻), which are illustrated by the symbols shown here parenthetically. Incoming process air line 41 is shown to include a damper 41a which is controllable by controller 60 and associated exemplary control lines (which may be hard wired or wireless) shown in dotted lines. FIG. 2 also shows water feed line 44a, without showing the source.

It is believed important to utilize two stages of operation, the first being a thermal gasification of urea to produce ammonia and isocyanic acid, followed directly with a second stage being a controlled catalyzed hydrolysis reaction wherein the isocyanic acid is hydrolyzed to ammonia with carbon dioxide as a byproduct. The urea is preferably supplied from 43 to the first stage of the process as an aqueous solution at a concentration of from about 30 to about 70%, with about 45 to about 60% being most preferred. The relative molar amounts of urea, water and air are important for successful operation.

The catalyst is preferably of the type used in SCR systems, typical of which are those with vanadium contents of from about 1 to about 4%. Other catalysts can be employed. The catalyst is desirably of a size to provide space velocities of 1000 to 30,000 hr$^{-1}$, e.g., from about 2500 to about 7500 hr$^{-1}$. The catalyst structure will preferably be monolithic with continuous channels causing little pressure drop across the depth or length of the catalyst and have a pitch of from 1 to 10 mm to accommodate this purpose. Catalysts based on vanadium, titanium and tungsten, typically as oxides, will be effective. In one embodiment a $TiO_2$ catalyst with a pitch of about 4 mm and containing a vanadium content of between 1 and 2% is effective.

The process steps will both require careful temperature control, and the second stage will require at least a critical amount of water without employing so much that the equipment must be too large to operate efficiently and create thermal demands in excess of those necessary for effective reaction.

It has also been found important to run the reaction in a manner to maintain a low concentration of intermediate products, e.g., isocyanic acid, in particular, so as to minimize the chances for side reactions to produce adverse byproducts, e.g., in cold spots in the reactors or ducting.

The molar ratios of air to water to urea will most effectively be from about 500:20:1 to about 1000:5:1. The molar ratios of water to urea will most effectively be from about 2:1 to 20:1, preferably within the range of from 6:1 to 10:1.

The use of two separate, sequential stages to the conversion of urea to a useful gas stream containing ammonia enables the gasification to occur completely at a high temperature and then a full conversion of HNCO to ammonia in near quantitative amounts, e.g., at least 90%, and preferably at least 95%, with 99% or more being a suitable target. When employing the high-temperature gasification in one stage including a hydrolysis catalyst, as done by some prior art procedures, there is a chance for processing anomalies due to the hydrolysis of HNCO at the same time as gasification. And, unless temperatures are carefully controlled and cold spots fully eliminated, side reactions are likely to occur. U.S. Pat. No. 6,878,359, to Mathes, et al., describes a single stage process using a catalyst to gasify urea, but provides no indication that separating gasification from hydrolysis into two stages as found highly effective for low-temperature applications by the invention herein, would be a useful alternative to a single stage process. We note that Mathes, et al., does not teach high enough initial temperature, temperature maintenance, or proper droplet size for a two stage process. Importantly, unless the droplets are small enough in the first-stage gasification, the droplets will not release the urea for decomposition early enough in a short, e.g., 1 to 10 second, time frame to fully gasify the urea, and the likelihood of forming byproducts downstream in the ductwork or the catalyst is increased. Temperature, reactants, droplet size, and heating time must all work together to achieve the correct reaction kinetics for full urea gasification without solid byproduct production.

At the high-end temperature of 200° C. mentioned for the single stage process of Mathes, et al., for example, the gases would be too cool to fully gasify the urea and maintain it in a gaseous state initially. Moreover, the gases would be further cooled by the water in the aqueous urea—the water being necessary in significant amounts to assure the required hydrolysis. Indeed, Mathes, et al., at column 8, lines 54+, states " . . . byproducts which are also formed in the process, such as for example melamine . . . , are deposited while they are still in the preparation reactor 10 and do not enter the exhaust gas line 1". Thus, it appears Mathes, et al., cannot guarantee complete gasification in a single stage with the hydrolysis catalyst.

In the first, gasification, stage of the process of the invention, it is important to employ suitably high temperatures, obtain a small droplet size of urea in the chamber and avoid the presence of cold spots. Droplet sizes are preferably controlled to be less than 500 μm, typically from 20 to 200 μm, as measured by laser techniques. Residence time in the chamber is necessarily short, e.g., on the order of from 1 to 10 seconds, typically from 2 to 6 seconds.

The amount of water present for hydrolysis will include that added by both the urea solution, including any dilution water, and the system air, and must be sufficient to fully hydrolyze the HNCO in the second stage of the process. Because water is characterized by an enthalpy of vaporization, 40.65 kJ/mol, more than five times the energy required to heat the same quantity of water from 0° C. to 100° C., any excess water should be avoided, but this has not been a concern of the prior art.

The heated gases entering stage one gasification chamber 46 via inlet 41 will gasify the urea, principally to ammonia and isocyanic acid (HNCO), leaving essentially no liquids or solids. The gases entering gasification chamber 46, will preferably be within the range of from 700 to 1400° F. at inlet and will be sufficient to fully gasify the aqueous urea solution for their time in the gasification reactor, to provide a first stage gas stream comprising ammonia and isocyanic acid. The first stage gas stream is withdrawn from the first stage thermal reactor and maintaining the temperature of first stage gas stream above at least 400° F., e.g., at least 500° F. to a point of introduction into the second stage catalytic reactor where the first stage gas stream will be passed into a second stage catalytic hydrolysis reactor at a temperature of from 350 to 600° F.

The gases are preferably heated to greater than 800° F. prior to being introduced into the chamber 46 at a temperature where they should remain above at least 600° F. Entering gas temperatures of from 850° to 1400° F. can be employed effectively. Supplemental heat can be supplied to the chamber as necessary. And, preferably, the chamber 46 will be well insulated to aid in temperature maintenance. The temperature of the gases and the residence time prior to exit from the chamber 46 will be effective to achieve full gasification. The entry temperature and temperature maintenance in chamber 46 should be high enough also to maintain an exit temperature of at least about 400° F., e.g., at least 450° F. and preferably at least 500° F.

If necessary, heating can be employed following gasification and as being transferred into hydrolysis reactor 48, but it is preferred that the gases entering chamber 46 will be hot enough to provide an exiting gas meeting the above criteria. Temperatures within hydrolysis reactor 48 are desirably within the range of from 350 to 600° F., and preferably within the range of from 400 to 500° F.

Systems employing the process and apparatus combine the disclosed features and incorporate details as necessary for a wide variety of industrial applications.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

What is claimed is:

1. A process for preparing a low-temperature stable ammonia containing gas stream to feed a low-temperature process requiring ammonia, comprising:
   a. in a first stage thermal reactor, feeding an aqueous urea solution to a gasification chamber,
   b. controlling feed of urea, water and heated gases to the first stage reactor in response to demand from a low-temperature process requiring ammonia;
   c. feeding heated gases into the gasification chamber upstream of the point for introducing the urea; wherein the inlet temperature of the gases in the gasification chamber is within the range of from 700 to 1400° F. and is effective to fully gasify the aqueous urea solution to provide a first stage gas stream comprising ammonia and isocyanic acid;
   d. withdrawing the first stage gas stream from the first stage thermal reactor and maintaining the temperature of first stage gas stream above 400° F. to a point of introduction into a second stage catalytic hydrolysis reactor;
   e. introducing the first stage gas stream into a second stage catalytic hydrolysis reactor at a temperature of up to 600° F.;
   f. monitoring the amounts of urea feed, water and heated gases fed into the first stage thermal reactor and adjusting as necessary to achieve hydrolysis in the second stage catalytic hydrolysis reactor;
   g. maintaining the temperature of the second stage catalytic hydrolysis reactor at a temperature above 370° F.; and
   h. withdrawing a second stage gas stream from the second stage catalytic hydrolysis reactor responsive to demand from a low-temperature process requiring ammonia.

2. A process according to claim 1, wherein the urea is employed as an aqueous solution having a concentration of within the range of from 30 to 70% by weight to provide an overall molar ratio of water to urea including moisture in the heated gases fed to the first stage reactor within the range of from 2:1 to 20:1.

* * * * *